US012692121B2

(12) United States Patent
Viljanen et al.

(10) Patent No.: US 12,692,121 B2
(45) Date of Patent: Jul. 28, 2026

(54) SOLUTION FOR OVERSPEED MONITORING OF AN ELEVATOR CAR

(71) Applicant: KONE Corporation, Helsinki (FI)

(72) Inventors: Mikko Viljanen, Helsinki (FI); Henri Wenlin, Helsinki (FI); Asmo Tenhunen, Helsinki (FI); Antti Kallioniemi, Helsinki (FI); Mikko Parviainen, Helsinki (FI)

(73) Assignee: KONE Corporation, Helsinki (FI)

( * ) Notice: Subject to any disclaimer, the term of this patent is extended or adjusted under 35 U.S.C. 154(b) by 1230 days.

(21) Appl. No.: 17/502,248

(22) Filed: Oct. 15, 2021

(65) Prior Publication Data

US 2022/0033214 A1 Feb. 3, 2022

Related U.S. Application Data

(63) Continuation of application No. PCT/FI2020/050181, filed on Mar. 23, 2020.

(30) Foreign Application Priority Data

Apr. 25, 2019 (EP) .................................... 19171053

(51) Int. Cl.
*B66B 1/24* (2006.01)
*B66B 5/06* (2006.01)

(52) U.S. Cl.
CPC .............. *B66B 1/2458* (2013.01); *B66B 5/06* (2013.01)

(58) Field of Classification Search
CPC ................................ B66B 1/2458; B66B 5/06
USPC .......................................................... 187/393
See application file for complete search history.

(56) References Cited

U.S. PATENT DOCUMENTS

2020/0055693 A1* 2/2020 Nagarajan ................. B66B 1/32

FOREIGN PATENT DOCUMENTS

| | | | | |
|---|---|---|---|---|
| GB | 2473025 A | 3/2011 | | |
| JP | 5026361 B2 | 9/2012 | | |
| JP | 5339705 B2 * | 11/2013 | | |
| WO | WO 2004/058616 A1 | 7/2004 | | |
| WO | WO-2011042612 A1 * | 4/2011 | ........... | B66B 1/3492 |
| WO | WO 2013/080300 A1 | 6/2013 | | |
| WO | WO 2015/078859 A1 | 6/2015 | | |

OTHER PUBLICATIONS

European Communication pursuant to Article 94(3) EPC for European Application No. 19171053.2, dated Nov. 24, 2023.

* cited by examiner

*Primary Examiner* — Jianchun Qin
(74) *Attorney, Agent, or Firm* — Birch, Stewart, Kolasch & Birch, LLP

(57) ABSTRACT

An elevator system includes at least two elevator cars adapted to travel in respective separate hoistways of the same building. The at least two elevator cars have at least two different rated speeds including lowest rated speed and a rated speed higher than the lowest rated speed. At least each elevator car with the rated speed higher than the lowest rated speed is provided with an electronic overspeed monitoring equipment configured to stop the movement of the elevator car, if the speed of the elevator car meets an overspeed threshold. The overspeed threshold is decreasing towards at least one end terminal of the hoistway. Each separate hoistway of the building has a bottom end terminal space with a substantially equal height and/or a top end terminal space with a substantially equal height.

20 Claims, 5 Drawing Sheets

SOLUTION FOR OVERSPEED MONITORING OF AN ELEVATOR CAR

CROSS REFERENCE TO RELATED APPLICATIONS

This application is a Continuation of PCT International Application No. PCT/FI2020/050181, filed on Mar. 23, 2020, which claims priority under 35 U.S.C. 119 (a) to European Patent Application No. 19171053.2, filed in the European Patent Office on Apr. 25, 2019, all of which are hereby expressly incorporated by reference into the present application.

TECHNICAL FIELD

The invention concerns in general the technical field of elevators. Especially the invention concerns safety of the elevators.

BACKGROUND

An elevator comprises an elevator car, an elevator controller and hoisting machine. The elevator car is driven with the hoisting machine by means of hoisting ropes, which run via a traction sheave of the hoisting machine. An elevator controller generates a motion profile for the elevator car. The elevator car is driven between landings in accordance with the generated motion profile. An example of an elevator car motion profile 100 is illustrated in FIG. 1, wherein the elevator car is first accelerated from a departure landing 102 to a maximum rated speed, and later decelerated from the maximum rated speed to stop smoothly to a destination landing 104. Typically, the speed of the elevator car is limited to a speed limit, which typically corresponds to the maximum rated speed added with a safety factor sf, e.g. the speed limit may be 115 percent of the maximum rated speed. The terminal speed limit is illustrated in FIG. 1 with the dashed line 106. The speed limit 106 is constant along a whole hoistway.

The elevator comprises further a safety equipment, such as a safety buffer, arranged in a pit of a hoistway. The safety equipment is dimensioned to absorb kinetic energy of an elevator car, which moves at the maximum rated speed. Further, a separate buffer may be provided in the pit to absorb kinetic energy of the counterweight.

The elevator comprises also hoisting machinery brakes, which may be opened or closed to brake the movement of the elevator hoisting machine and thus also the movement of the elevator car. Further, the elevator comprises an overspeed governor, which actuates electrically hoisting machinery brakes to stop the elevator car if the speed of the elevator car exceeds the speed limit, for example 115 percent of the maximum rated speed of the elevator car. Furthermore, if the speed of the elevator car exceeds a second speed limit corresponding to the maximum rated speed added with a higher safety factor, e.g. the second speed limit may be 130 percent of the maximum rated speed, the overspeed governor actuates mechanically safeties (e.g. safety gear of elevator car) to stop the movement of the elevator car. Thus, causing that the overspeed governor activation may comprise two phases, i.e. the first actuation phase for minor overspeed (e.g. 115 percent of the maximum rated speed) and the second actuation phase for major overspeed (e.g. 130 percent of the maximum rated speed).

Typically, when there are several elevator cars with different rated speeds travelling in separate hoistways in a same building, each one has a different overspeed governor with different triggering limit, as well as different pit safety equipment, e.g. with different dimensioning and structure. Because dimensioning of the pit safety equipment affects to the depth of the hoistway pit, hoistway pits with different depths are required in the same building.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an elevator system, a process for providing an elevator hoistway arrangement, and an elevator hoistway arrangement. Another objective of the invention is that the elevator system, the process for providing an elevator hoistway arrangement, and the elevator hoistway arrangement enable a unified hoistway structure with unified pit height, unified headroom height and/or unified safety equipment.

The objectives of the invention are reached by an elevator system, a process, and an elevator hoistway arrangement as defined by the respective independent claims.

According to a first aspect, an elevator system comprising at least two elevator cars adapted to travel in respective separate hoistways of the same building is provided, wherein the at least two elevator cars have at least two different rated speeds comprising lowest rated speed and a rated speed higher than the lowest rated speed, wherein at least each said elevator car with the rated speed higher than the lowest rated speed is provided with an electronic overspeed monitoring equipment configured to stop the movement of the elevator car, if the speed of the elevator car meets an overspeed threshold, wherein the overspeed threshold is decreasing towards at least one end terminal of the hoistway and wherein each of said separate hoistway of the building has a bottom end terminal space with a substantially equal height and/or a top end terminal space with a substantially equal height.

The substantially equal height of the bottom end terminal spaces and/or the top end terminal spaces of said separate hoistways may be dimensioned according to the elevator car with the lowest rated speed.

Alternatively or in addition, the substantially equal height of the bottom end terminal spaces and/or the top end terminal spaces of said separate hoistways may be lower than height of the bottom end terminal spaces and/or top end terminal spaces of said separate hoistways dimensioned according to elevator car with the highest rated speed.

The at least one end terminal of each of said separate hoistway may be a bottom end terminal of the hoistway and/or a top end of the hoistway, and the bottom end terminal space may be a pit of the hoistway and the top end terminal space may be a headroom of the hoistway.

Furthermore, each of said separate hoistway may be provided with the same first safety equipment dimensioned to absorb kinetic energy of the elevator car with the lowest rated speed and/or with the same second safety equipment dimensioned to absorb kinetic energy of the counterweight with speed corresponding to the lowest rated speed.

Each elevator car with the lowest rated speed may be provided with a mechanical overspeed governor.

Alternatively, each of the at least two elevator cars may be provided with the electronic overspeed monitoring equipment.

Moreover, the substantially equal height of the bottom end terminal spaces and/or the top end terminal spaces of said separate hoistways may be dimensioned to be smaller than the height of the bottom end terminal spaces and/or top end terminal spaces of said separate hoistways dimensioned according to elevator car with the lowest rated speed.

The electronic overspeed monitoring equipment may comprise a safety monitoring unit communicatively connected to the elevator car or to the counterweight via a safety data bus; one or more brake control units; one or more safety brakes comprising triggering elements connected to the one or more brake control units; an absolute positioning system configured to provide continuously information representing movement of the elevator car or movement of the counterweight and is communicatively connected to the safety monitoring unit via the safety data bus; wherein the safety monitoring unit may be configured to: obtain the information representing movement of the elevator car or movement of the counterweight from the absolute positioning system, monitor the movement of the elevator car or movement of the counterweight, generate a closing command to the one or more brake control units, if the speed of the elevator car or the speed of the counterweight is detected to meet the overspeed threshold, wherein the closing command comprises an instruction to apply the one or more safety brakes in order to stop the movement of the elevator car.

The absolute positioning system may comprise: an encoder associated with an elevator car pulley, a counterweight pulley, a guide roller or a governor pulley of an overspeed governor; and a door zone sensor comprising a reader arranged to the elevator car or to the counterweight and a target arranged to a door zone of each landing.

The monitoring of the movement of the elevator car or the movement of the counterweight may be performed in the proximity of at least one end terminal of the elevator hoistway.

Furthermore, after generating the closing command to the one or more brake control unit, the safety monitoring unit may be configured to: continue the monitoring of the movement of the elevator car or the movement of the counterweight, generate a triggering signal to an elevator car safety gear to stop the movement of the elevator car, if the speed of the elevator car or the counterweight is detected to meet a second overspeed threshold, which is higher than said overspeed threshold.

According to a second aspect, a process for providing an elevator hoistway arrangement comprising at least two separate elevator hoistways inside the same building is provided, wherein the process comprises: casting the at least two separate elevator hoistways from a castable material so that each of said at least two separate hoistways has a pit with a substantially equal height, constructing walls on the pits to define the hoistways (208*a*, 208*b*), and providing the elevator system described above therein.

According to a third aspect, an elevator hoistway arrangement is provided, wherein the elevator hoistway arrangement comprises at least two separate elevator hoistways, which are obtainable with the process described above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 2:
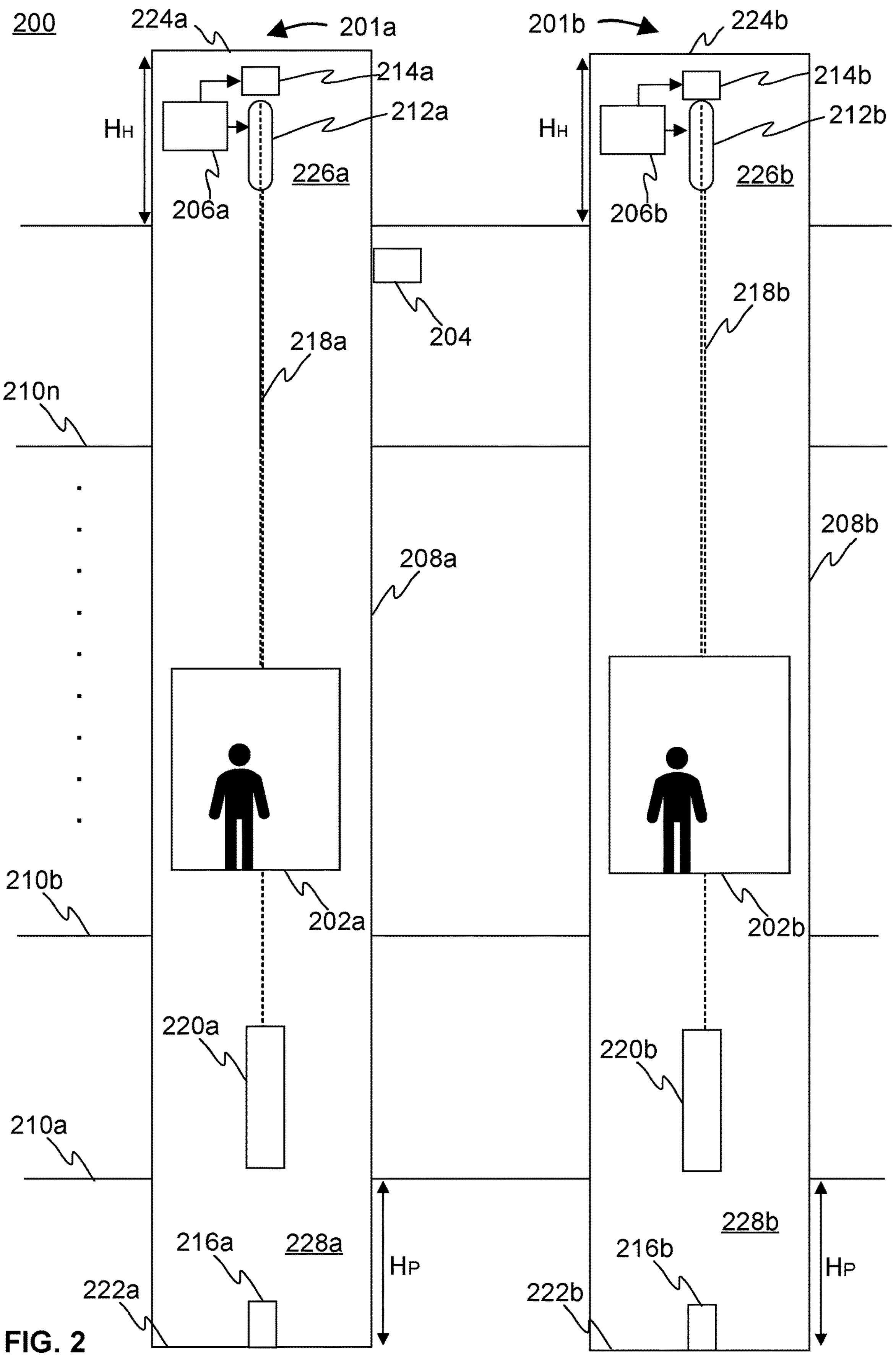
FIG. 2 illustrates schematically an example of an elevator system according to the invention.

FIG. 2 illustrates schematically an example of an elevator system 200 according to the invention. The elevator system 200 comprises at least two elevator sub-systems 201*a*, 201*b* in the same building. Each elevator sub-system 201*a*, 201*b* comprises an elevator car 202*a*, 202*b* adapted to travel in a separate hoistway 208*a*, 208*bb*. In other words, the elevator system 200 comprises at least two elevator cars 202*a*, 202*b* adapted to travel in respective separate hoistways 208*a*, 208*b* of the same building. The example elevator system 200 of FIG. 2 comprises two elevator sub-systems 201*a*, 201*b* and two elevator cars, a first elevator car 202*a* adapted to travel in a first hoistway 208*a* and a second elevator car 202*b* adapted to travel in a second hoistway 208*b*, wherein the first hoistway 208*a* and the second hoistway 208*b* are inside the same building. However, the number of elevator subsystems and/or or elevator cars is not limited. The elevator system 200 may further comprise an elevator control unit 204 configured to control at least partly the operation of the elevator system 200. If the elevator system 200 comprises a machine room, the elevator control unit 204 may be arranged in the machine room of the elevator system 200. The machine room, i.e. motor room, may reside above the hoistway 208, at the bottom of the hoistway 208, or in the middle of the building adjacent to the hoistway 208. Alternatively, the elevator control unit 204 may be arranged to one landing, e.g. to a frame of a landing door at said one landing. Especially, if the elevator system 200 is implemented as a machine-roomless elevator system, the elevator control unit 204 may be arranged to one landing, but also if the elevator system 200 comprises the machine room, the elevator control unit 204 may be arranged to one landing. Alternatively, the elevator control unit 204 may be implemented as an external control unit, e.g. an external control unit residing in a technical room nearby the elevator system 200 inside the same building or inside another building than the elevator system 200, or a remote server, such as a cloud server or any other external server. In the example elevator system 200 of FIG. 2 the elevator control unit is arranged to the top-most landing 210*n*.

Each elevator sub-system 201*a*, 201*b* comprises a drive unit 206*a*, 206*b* and an elevator hoisting machine. The example elevator system 200 illustrated in FIG. 2 is a conventional rope-based elevator system 200 comprising hoisting ropes 218 or belt for carrying, i.e. suspending, the elevator car 202*a*, 202*b*. A belt may comprise a plurality of hoisting ropes 218*a*, 218*b* travelling inside the belt. To carry the elevator car 202*a*, 202*b*, the ropes 218*a*, 218*b* may be arranged to pass from the elevator car 202*a*, 202*b* over a pulley, i.e. a traction sheave, of the hoisting machine to a counterweight 220*a*, 220*b*. In one to one (1:1) roping as illustrated in FIG. 2, the elevator car 202*a*, 202*b* may be arranged to one end of the ropes 218*a*, 218*b* and the counterweight 220*a*, 220*b* may be arranged to the other end of the ropes 218*a*, 218*b*. With the 1:1 roping the elevator car 202*a*, 202*b*, the counterweight 220*a*, 220*b* and the hoisting ropes 218*a*, 218*b* all travel at the same speed. Alternatively, in two to one (2:1) roping, one end of the hoisting ropes 218*a*, 218*b* passes from a dead end hitch arranged to a top end terminal 224*a*, 224*b* of the hoistway 208*a*, 208*b* down and under the elevator car pulley(s), i.e. elevator car sheave (s), up over the traction sheave of the hoisting machine, down around a counterweight pulley(s), i.e. counterweight sheave(s), and up to another dead end hitch arranged to the top end terminal 224*a*, 224*b* of the hoistway 208*a*, 208*b*. With the 2:1 roping the speed of the elevator car 202*a*, 202*b* and the counterweight 220*a*, 220*b* is one half of the speed of the hoisting ropes. Moreover, one or more diverter pulleys may be used to direct the hoisting ropes 218*a*, 218*b* to the elevator car 202*a*, 202*b* and/or to the counterweight 220*a*, 220*b*. For example, the counterweight 220*a*, 220*b* may be a metal tank with a ballast of weight approximately 40-50 percent of the weight of a fully loaded elevator car 202*a*, 202*b*. The drive unit 206 is configured to control the elevator hoisting machine to drive the elevator car 202*a*, 202*b* along the hoistway 208*a*-208*b* between landings 210*a*-210*n*. The drive unit 206*a*, 206*b* may be arranged in the hoistway 208*a*, 208*b*, e.g. in a headroom 226*a*, 226*b* of the hoistway 208*a*, 208*b* as in the example elevator system 200 illustrated in FIG. 2. The drive unit 206*a*, 206*b* controls the elevator hoisting machine by supplying power from mains to an electrical motor 212*a*, 212*b* of the elevator hoisting machine to drive the elevator car 202*a*, 202*b*. Each elevator sub-system 201*a*, 201*b* further comprises hoisting machinery brakes 214*a*, 214*b* to stop the movement of the elevator car 202*a*, 202*b*. Each elevator sub-system 201*a*, 201*b* comprises further a first safety equipment 216*a*, 216*b*, such as a safety buffer, arranged in a bottom end terminal space, i.e. a pit, 228*a*, 228*b* of the hoistway 208*a*, 208*b* to absorb kinetic energy of the elevator car 202*a*, 202*b*. Furthermore, each elevator sub-system 201*a*, 201*b* may comprise a second safety element 218*a*, 218*b*, e.g. a safety buffer, (not shown in FIG. 2) arranged in the bottom end terminal space, i.e. the pit, 228*a*, 228*b* to absorb kinetic energy of the counterweight 220*a*, 220*b*.

According to another example of the invention the elevator system 200 may be a non-rope based elevator system. In a non-rope based elevator system instead of using hoisting ropes, the propulsion force to the elevator car 202*a*, 202*b* may be provided in a ropeless manner with a motor acting directly on the elevator car 202*a*, 202*b*, such as a linear motor, track and pinion motor, or corresponding. Next the different embodiments of the invention are described mainly referring to a conventional rope-based elevator system (e.g. the example elevator system 200 of FIG. 2), but the invention is not limited only to the conventional rope-based elevator systems and all the embodiments of the invention described in this application may also be implemented in a non-rope based elevator system.

The at least two elevator cars 202*a*, 202*b* of the elevator system 200 have at least two different rated speeds comprising the lowest rated speed and a rated speed higher than the lowest rated speed. For example, if the elevator system 200 comprises two elevator cars, the rated speed of one elevator car may be lower than the rated speed of the other elevator car. According to another example, if the elevator system comprises more than two elevator cars, at least one of the elevator cars has lower rated speed than the other elevator cars.

At least each said elevator car with the rated speed higher than the lowest rated speed is provided with an electronic overspeed monitoring equipment configured to stop the movement of the elevator car, if the speed of the elevator car 202*a*, 202*b* or the counterweight 220*a*, 220*b* meets an overspeed threshold. For sake of clarity all the components of the electronic overspeed monitoring equipment are not shown in FIG. 2. The overspeed threshold is decreasing towards at least one end terminal of the hoistway 208*a*, 208*b*. The at least one end terminal of the hoistway 208*a*, 208*b* may be a bottom end terminal 222*a*, 222*b* of the hoistway 208*a*, 208*b* and/or a top end terminal 224*a*, 224*b* of the hoistway 208*a*, 208*b*. The overspeed threshold is a continuous curve, which decreases towards the bottom end terminal 222*a*, 222*b* of the hoistway 208*a*, 208*b* and/or a top end terminal 224*a*, 224*b* of the hoistway 208 such that the triggering takes place with lower speeds as the elevator car 202*a*, 202*b* approaches the bottom end terminal 222*a*, 222*b* of the hoistway 208*a*, 208*b* and/or a top end terminal 224*a*, 224*b* of the hoistway 208. In other words, the overspeed threshold varies depending on the position of the elevator car 202*a*, 202*b* inside the hoistway 208*a*, 208*b* so that the overspeed threshold is lower in the vicinity of the end terminals of the hoistway 208*a*, 208*b* than in the middle section of the hoistway 208*a*, 208*b*. Higher speed of the elevator car 202*a*, 202*b* may be allowed in the middle section of the hoistway 208 than in the vicinity of the end terminals 222*a*, 222*b*, 224*a*, 224*b* of the hoistway 208*a*, 208*b*. The overspeed threshold according to the invention will be described more later in this application referring to FIG. 3. As discussed above, the speed of the counterweight 220*a*, 220*b* corresponds to the speed of the elevator car 202*a*, 202*b*. Thus, alternatively or in addition, the speed of the counterweight may be monitored by means of the overspeed monitoring equipment similarly as the speed of the elevator car 202*a*, 202*b*.

The electronic overspeed monitoring equipment with the decreasing overspeed threshold provided to at least each elevator car 202*a*, 202*b* with the rated speed higher than the lowest rated speed enables that each of said separate hoistway 208*a*, 208*b* of the building may have a bottom end terminal space 228*a*, 228*b* with a substantially equal height and/or a top end terminal space 226*a*, 226*b* with a substantially equal height. The bottom end terminal space may be the pit 228*a*, 228*b* of the hoistway and the top end terminal space may be the headroom 226*a*, 226*b*, i.e. overhead structure, of the hoistway 208*a*, 208*b*. In other words, each of said separate hoistways 208*a*, 208*b* of the building has the pit 228*a*, 228*b* with a substantially equal pit height, i.e. depth, and/or the headroom 226*a*, 226*b* with a substantially equal headroom height, i.e. all the separate hoistways of the elevator system 200 have substantially equal height pit 228*a*, 228*b* and/or substantially equal height headroom 226*a*, 226*b* with each other.

In the example elevator system 200 of FIG. 2, the pit height of the hoistways 208*a*, 208*b* are illustrated with the arrows $H_P$ and the headroom height of the hoistways 208*a*, 208*b* are illustrated with the arrows $H_H$. The term "substantially" equal height" in conjunction with the heights of the end terminal spaces, e.g. pits 228*a*, 228*b* and/or headrooms 226*a*, 226*b*, means height within typical building manufacture tolerances, such as variation of +/−50 millimeters, in particular variation of +/−25 millimeters.

According to an example embodiment according to the invention, the substantially equal height of the bottom end terminal spaces 228*a*, 228*b* and/or the top end terminal spaces 226*a*, 226*b* of said separate hoistways 208*a*, 208*b* may be dimensioned according to the elevator car 202*a*, 202*b* with the lowest rated speed. In other words, the lowest rated speed defines the heights of the pits 228*a*, 228*b* and/or the headrooms 226*a*, 226*b* of all hoistways 208*a*, 208*b* of the elevator system 200. This enables that the pit heights and/or headroom heights of all separate hoistways 208*a*, 208*b* of the elevator system 200 may be harmonized, i.e. unified, according to the to the elevator car 202*a*, 202*b* with the lowest rated speed, even if one or more of the elevator cars of the elevator system 200 has higher rated speed than the lowest rated speed. The substantially equal height of the bottom end terminal spaces 228*a*, 228*b* of said separate hoistways 208*a*, 208*b* may be lower than height of the bottom end terminal spaces 226*a*, 228*b* of said separate hoistways 208*a*, 208*b* dimensioned according to elevator car with the highest rated speed. Alternatively or in addition, the substantially equal height of the top end terminal spaces 226*a*, 226*b* of said separate hoistways 208*a*, 208*b* may be lower than height of top end terminal spaces 226*a*, 226*b* of said separate hoistways 208*a*, 208*b* dimensioned according to elevator car with the highest rated speed.

Dimensioning the height, i.e. depth, of the pit 228*a*, 228*b* according to the elevator car 202*a*, 202*b* with a specific rated speed means that the pit height has the height that is required for installation of the first safety equipment 216*a*, 216*b*, e.g. safety buffers, therein needed to absorb impact energy of the elevator car 202*a*, 202*b* moving with the specific rated speed and the second safety equipment 218*a*, 218*b* e.g. safety buffers, provided for the counterweight 220*a*, 220*b* to absorb impact energy of the counterweight 220*a*, 220*b* with the speed corresponding to the specific rated speed in the same way. Dimensioning the height of the headroom 226*a*, 226*b* according to the elevator car 202*a*, 202*b* with a specific rated speed means that the headroom height corresponds to the distance that is required for the elevator car 202*a*, 202*b* and for the counterweight 220*a*, 220*b* travel towards the top end terminal of the hoistway 208*a*, 208*b*, when the other one hits the respective safety equipment 216*a*, 216*b*, 218*a*, 218*b*. When the counterweight 220*a*, 220*b* hits the second safety equipment 218*a*, 218*b*, the elevator car 202*a*, 202*b* cannot travel towards the top end terminal 224*a*, 224*b* of the hoistway 208*a*, 208*b* anymore. Correspondingly, when the elevator car 202*a*, 202*b* hits the first safety equipment 216*a*, 216*b*, the counterweight 220*a*, 220*b* cannot travel towards the top end terminal 224*a*, 224*b* of the hoistway 208*a*, 208*b* anymore. The higher the lowest rated speed is the higher the equal height of the pits 228*a*, 228*b* and/or the headrooms 226*a*, 226*b* of the separate hoistways 208*a*, 208*b* of the elevator system 200 is.

Thus, in addition to the substantially equal height of the of the pits 228*a*, 228*b* and/or the headrooms 226*a*, 226*b*, each of said separate hoistways 208*a*, 208*b* may be provided with the same first safety equipment 216*a*, 216*b* dimensioned to absorb the kinetic energy of the elevator car 202*a*, 202*b* with the lowest rated speed and/or with the same second safety equipment 218*a*, 218*b* dimensioned to absorb the kinetic energy of the counterweight 220*a*, 200*b* with the speed corresponding to the lowest rated speed. This enables that the first safety equipment 216*a*, 216*b* and the second safety equipment 218*a*, 218*b* of each separate hoistways 208*a*, 208*b* may be equally dimensioned with each other. The equally dimensioned safety equipment 216*a*, 216*b*, 218*a*, 218*b* enables that the safety equipment 216*a*, 216*b*, 218*a*, 218*b* of the hoistways 208*a*, 208*b* of the elevator cars with the rated speed higher than the lowest rated speed may be dimensioned to be reduced sized, i.e. smaller than the safety equipment 216*a*, 216*b*, 218*a*, 218*b* dimensioned to absorb the kinetic energy of the elevator car or the counterweight 220*a*, 220*b* with the rated speed higher than the lowest rated speed. For example, each of the separate hoistways 208*a*, 208*b*, of the building may have an end terminal space, e.g. pit 228*a*, 228*b*, and/or head room 226*a*, 226*b*, with a substantially equal height dimensioned for first safety equipment 216*a*, 216*b*, e.g. a buffer, to absorb kinetic energy of the elevator car 202*a*, 202*b* with rated speed of less than 2.5 m/s or second safety equipment 218*a*, 2168, e.g. a buffer, to absorb kinetic energy of the counterweight 220*a*, 220*b* with rated speed of less than 2.5 m/s. This may mean safety equipment 216*a*, 216*b*, 218*a*, 218*b* with stroke of no more than 420 millimeters, and preferably less than 420 millimeters.

According to an example embodiment according to the invention, each elevator car 202*a*, 202*b* with the lowest rated speed may be provided with a mechanical overspeed governor (OSG) to stop the movement of the elevator car 202*a*, 202*b*, if the speed of the elevator car 202*a*, 202*b* meets a constant predefined speed limit. The overspeed governor may be arranged inside the hoistway 208*a*, 208*b*. The overspeed governor may comprise a governor pulley, i.e. a sheave, rotated by a governor rope that forms a closed loop and is coupled to the elevator car 202*a*, 202*b* so that the governor rope moves with the elevator car 202*a*, 202*b* at the same speed, i.e. the rotating speed of the governor pulley corresponds to the speed of the elevator car 202*a*, 202*b*. The governor pulley may be arranged for example to the upper end of the governor rope loop and is coupled to an actuation mechanism that reacts to the speed of the elevator car 202*a*, 202*b* and actuates the safety gear of the elevator car 202*a*, 202*b* to stop the movement of the elevator car 202*a*, 202*b*, if the speed of the elevator car 202*a*, 202*b* meets the constant predefined speed limit. The safety gear is a mechanical safety device arranged to the elevator car 202*a*, 202*b*. The safety gear may comprise e.g. a solenoid as a triggering element.

For example, if the elevator system 200 comprises two elevator cars (e.g. as in the example elevator system of FIG. 2), a first elevator car 202*a* adapted to travel in a first hoistway 208*a* and a second elevator car 202*b* adapted to travel in a second hoistway 208*b*, wherein the first hoistway 208*a* and the second hoistway 208*b* are inside the same building. The first elevator car 202*a* has a rated speed of 1.6 m/s and the second elevator car 202*b* has a rated speed of 3 m/s. In this example, the second elevator car 202*b* is provided with the electronic overspeed monitoring equipment configured to stop the movement of the second elevator car 202*b*, if the speed of the second elevator car 202*b* meets an overspeed threshold that is decreasing towards the bottom end terminal 222*b* of the second hoistway 208*b*. In this example, the first elevator car 202*a* with the lowest rated speed is provided with a mechanical overspeed governor configured to stop the movement of the first elevator car 202*a*, if the speed of the first elevator car 202*a* meets a constant predefined speed limit. The electronic overspeed monitoring equipment enables that the pit depths $H_P$ of the both hoistways 208*a*, 208*b* may be dimensioned with substantially equal depth according to the first elevator car 202*a* with the lowest rated speed. The substantially equal depth of the pits with the above rated speeds may be e.g. approximately between 1500 millimeters and 2300 millimeters, preferably approximately 1700 millimeters. As a comparison, if the depths of the pits are dimensioned according to the elevator car with the higher rated speed, i.e. 3 m/s in this example, the depths of the pits are approximately 3100 millimeters. If the both elevator cars 202*a*, 202*b* would be provided with the traditional overspeed governors, as at least in some prior art solutions, the depth of the pit 228*a* of the first hoistway 208*a*, where the first elevator car 202*a* with the rated speed of 1.6 m/s is adapted to travel, may be e.g. approximately between 1500 millimeters and 2300 millimeters, preferably approximately 1700 millimeters and the depth of the pit 228*b* of the second hoistway 208*b*, where the second elevator car 202*b* with the rated speed of 3 m/s is adapted to travel, may be approximately 3100 millimeters. In the above example the pit depths of the hoistways 208*a*, 208*b* are dimensioned with substantially equal depth, but alternatively or in addition, the headroom heights $H_H$ of the both hoistways 208*a*, 208*b* may be dimensioned with substantially equal height. The rated weight of the first elevator car 202*a* is 1600 kilograms and the rated weight of the second elevator car 202*b* is 1600 kilograms in this example, but the invention is not limited to that and any other rated weights of the elevator car may be used. The rated weight of the elevator car 202*a*, 202*b* has an effect on the kinetic energy of the elevator car 202*a*, 202*b* and thus also to the dimensions of the pit safety equipment 216*a*, 216*b* which is dimensioned to absorb the kinetic energy of the elevator car 202*a*, 202*b* with the lowest rated speed.

Figure 1:
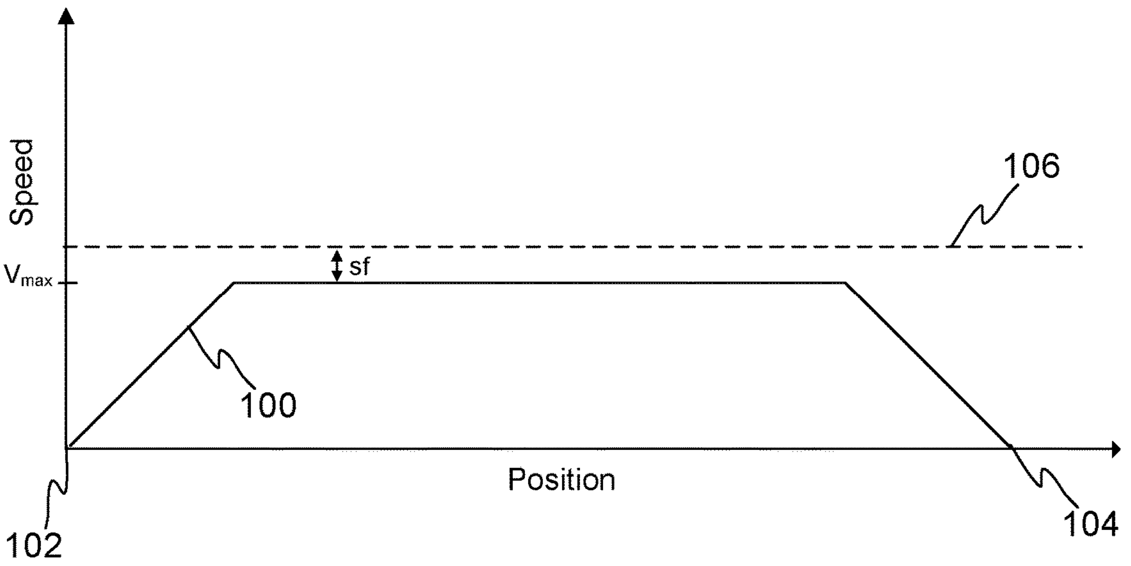
FIG. 1 Prior art
FIG. 1 illustrates schematically an example of an elevator car motion profile according to prior art.
Figure 3:
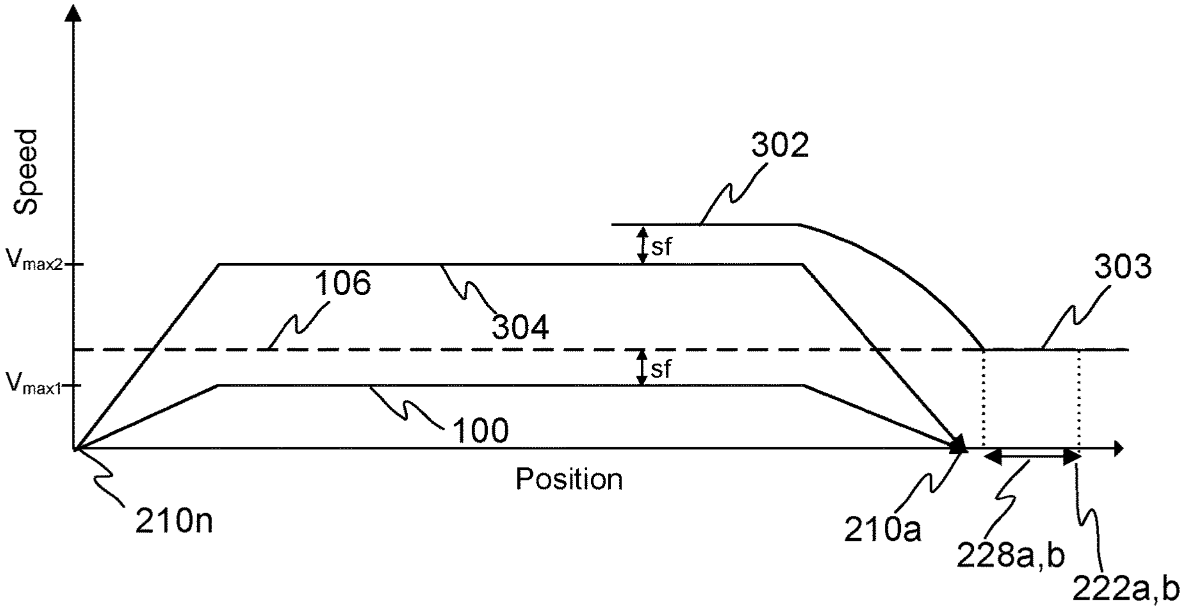
FIG. 3 illustrates schematically an example of the overspeed threshold according to the invention.

FIG. 3 illustrates an example of the overspeed threshold according to the invention, wherein the elevator system 200 comprises two elevator cars (e.g. as in the example elevator system of FIG. 2), a first elevator car 202*a* adapted to travel in a first hoistway 208*a* and a second elevator car 202*b* adapted to travel in a second hoistway 208*b*, wherein the first hoistway 208*a* and the second hoistway 208*b* are inside the same building. The first elevator car 202*a* has a rated speed of lower than the rated speed of the second elevator car 202*b*. The first elevator car 202*a* with the lower rated speed is provided with a mechanical overspeed governor and the second elevator car 202*b* is provided with the electronic overspeed monitoring equipment. The pit depths $H_P$ of the both hoistways 208*a*, 208*b* may be dimensioned with substantially equal depth according to the elevator car with the lowest rated speed, i.e. according to the first elevator car 202*a* in this example. Furthermore, each of said separate hoistways 208*a*, 208*b* may be provided with the same first safety equipment 216*a*, 216*b* dimensioned to absorb the kinetic energy of the elevator car with the lowest rated speed, i.e. the first elevator car 202*a* in this example, and/or with the same second safety equipment 218*a*, 218*b* dimensioned to absorb the kinetic energy of the counterweight 220*a*, 200*b*, with the speed corresponding to the lowest rated speed. The overspeed limit 106 of the first elevator car 202*a* is a constant speed limit, which corresponds to the maximum rated speed $v_{max1}$ of the first elevator car 202*a* added with a safety factor sf, e.g. the speed limit 106 may be 115 percent of the maximum rated speed $v_{max1}$ of the first elevator car 202*a*. In FIG. 3 also an example elevator car motion profile 100 of the first elevator car 202*a* is illustrated, wherein the first elevator car 202*a* is first accelerated from a departure landing (in this example the top-most landing 210*n*) to the maximum rated speed $v_{max1}$ of the first elevator car 202*a*, and later decelerated from the maximum rated speed $v_{max1}$ of the first elevator car 202*a* to stop smoothly to a destination landing (in this example the bottom-most landing 210*a*). Moreover, in FIG. 3 also an example elevator car motion profile 304 of the second elevator car 202*b* is illustrated, wherein the second elevator car 202*a* is first accelerated from a departure landing (in this example the top-most landing 210*n*) to a maximum rated speed $v_{max2}$ of the second elevator car 202*b*, and later decelerated from the maximum rated speed $v_{max2}$ of the second elevator car 202*b* to stop smoothly to a destination landing (in this example the bottom-most landing 210*a*). The maximum rated speed $v_{max2}$ of the second elevator car 202*b* is higher than the maximum rated speed $v_{max1}$ of the first elevator car 202*a*. The overspeed threshold 302 of the second elevator car 202*b* is decreasing towards the bottom-end terminal 222*a*, 222*b* of the hoistway 208*a*, 208*b* in this example. Alternatively or in addition, the overspeed threshold 302 may be decreasing towards the top-end terminal 224*a*, 224*b* of the hoistway 208*a*, 208*b*. When the second elevator car 202*b* is travelling at the maximum rated speed $v_2$ the overspeed threshold 302 is above the maximum rated speed $v_2$, i.e. the overspeed threshold 302 may be added with a safety factor sf, e.g. 115 percent of the maximum rated speed $v_{max2}$ of the second elevator car 202*b*, and when the speed of the elevator car 202*a*, 202*b* starts to decrease when the elevator car 202*b* is approaching to pit 228*b*, the overspeed threshold 302 starts to decrease. At the pit 228*b* the overspeed threshold 302 levels to a lower limit 303 of the overspeed threshold 302. Because the first safety equipment 216*b* and the second safety equipment 218*b* arranged in the pit 228*b* of the hoistway 208*b* for the second elevator car 202*b* and the respective counterweight 220*b* are dimensioned to absorb the kinetic energy of the first elevator car 202*a* and the counterweight 220*a* with the lowest rated speed, the lower limit 303 of the overspeed threshold 302 is limited to the maximum rated speed $v_{max1}$ of the first elevator car 202*b*, i.e. lowest rated speed added with a safety factor sf, e.g. 115 percent of the lowest rated speed, i.e. to the same level as the overspeed limit 106 of the first elevator car 202*a*. The safety factor added to the maximum rated speed $v_{max2}$ of the second elevator car 202*b* and to the maximum rated speed $v_{max1}$ of the first elevator car 202*a* may be the same safety factor or different safety factor. The electronic overspeed equipment according to the invention provided to each elevator car 202*b* with the rated speed higher than the lowest rated speed enables the use of reduced safety equipment 216*b*, 218*b*, e.g. reduced buffers of the elevator car 202*b* and the counterweight 220*b*, a reduced pit 228*b* depth and/or reduced headroom height 226*b*, and higher rated speed of the elevator car 202*b* than if each elevator car 202*b* with the rated speed higher than the lowest rated speed with would be provided with the mechanical overspeed governor.

Figure 4:
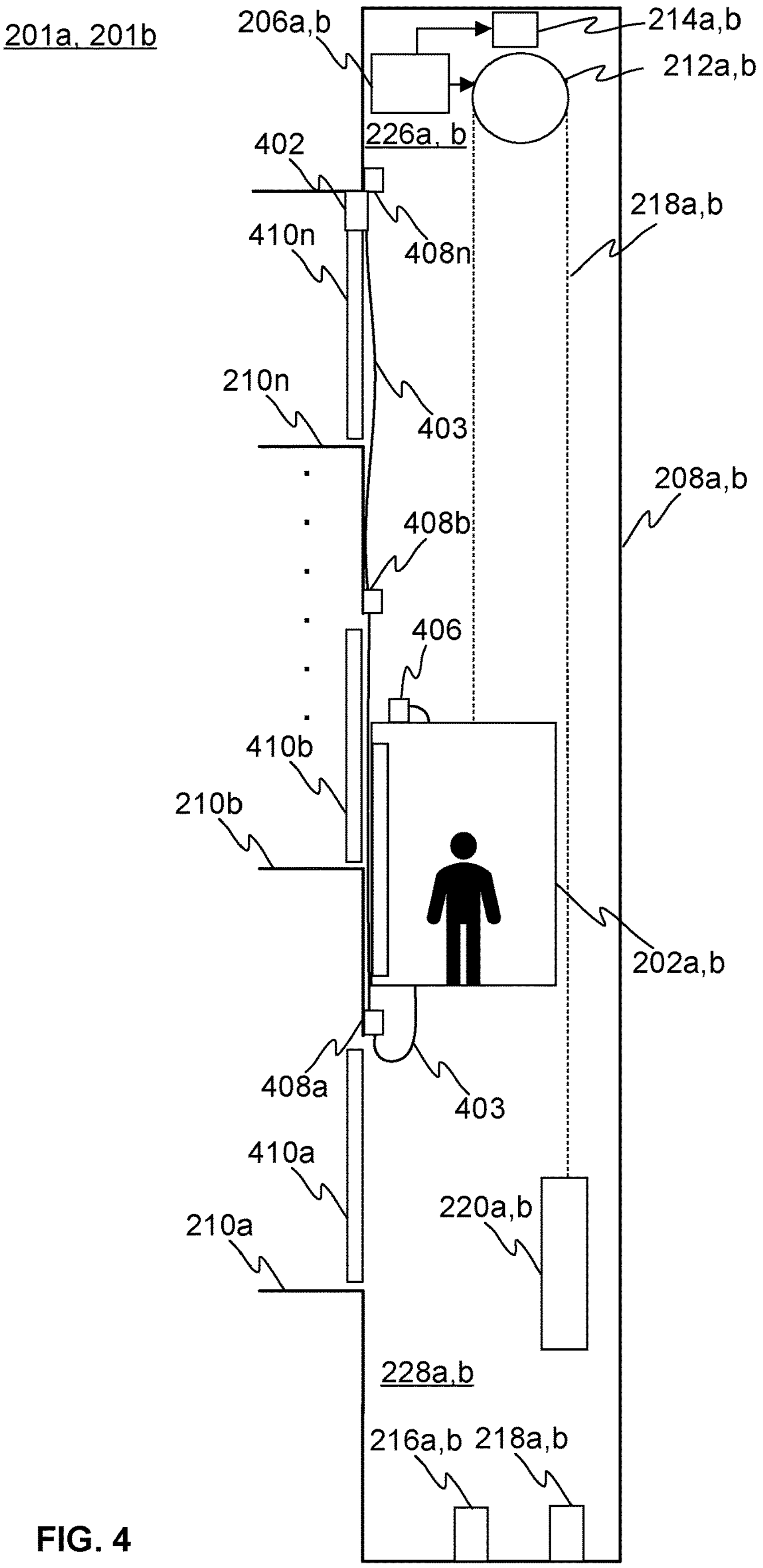
FIG. 4 illustrates schematically an example elevator subsystem, wherein an electronic overspeed monitoring equipment according to the invention is implemented.

According to another example embodiment of the invention, each of the at least two elevator cars 202*a*, 202*b* of the elevator system 200 may be provided with the electronic overspeed monitoring equipment. This improves further the safety of the elevator system 200. The substantially equal height of the end terminal space may be dimensioned according to the elevator car 202*a*, 202*b* with the lowest rated speed as discussed above. However, providing of each of the at least two elevator cars 202*a*, 202*b* of the elevator system 200 with the electronic overspeed monitoring equipment enables that the substantially equal height of the bottom end terminal spaces and/or top end terminal spaces 226*a*, 226*b* of said separate hoistways 208*a*, 208*b* may be dimensioned to be even smaller than the height of the bottom end terminal spaces 228*a*, 228*b* and/or top end terminal spaces 226*a*, 226*b* of said separate hoistways 208*a*, 208*b* dimensioned according to elevator car with the lowest rated speed. This is because lower limit of the overspeed threshold (subtracted with the safety factor) defines the lowest speed that the elevator cars 202*a*, 202*b* may travel at the at the position of the end terminal space, i.e. at the pit 228*a*, 228*b* or at the headroom 226*a*, 226*b*. The lowest speed may be smaller than the lowest rated speed of the elevator car provided with the mechanical overspeed governor. Said lowest speed in turn defines the dimensions of the safety equipment 216*a*, 216*b*, 218*a*, 218*b* and the height of the end terminal space 226*a*, 226*b*, 228*a*, 228*b* of the hoistway 208*a*, 208*b*. This may allow the use of polyurethane buffers instead of traditional oil buffers. The polyurethane buffers enable lower dimensions of the buffers than the oil buffers. FIG. 4 illustrates schematically an example elevator subsystem 201*a*, 201*b*, wherein the electronic overspeed monitoring equipment is provided. The FIG. 4 is a side-view of the elevator subsystem 201*a*, 201*b* of FIG. 2. The electronic overspeed monitoring equipment comprises a safety monitoring unit 402 communicatively connected to the elevator car 202*a*, 202*b* via a safety data bus and an absolute positioning system. The safety data bus may run inside a travelling cable 403 as shown in FIG. 4. Alternatively, the safety data bus may be implemented wirelessly, e.g. via an electromagnetic radio signal. The safety monitoring unit 402, e.g. safety controller, may be arranged to one landing 210*a*-210*n*, e.g. to a frame of a landing door 410*a*-410*n* at said one landing 210*a*-210*n*. In the example elevator subsystem 201*a*, 201*b* of FIG. 4 the safety monitoring unit 402 is arranged to the frame of the landing door 410*n* of the top-most landing 210*n*. The electronic overspeed monitoring equipment further comprises one or more brake control units and one or more safety brakes. The one or more safety brakes may comprise the hoisting machinery brakes 214*a*, 214*b* of the elevator sub-system 201*a*, 201*b* to which the electronic overspeed monitoring equipment is provided and/or elevator car brakes (not shown in FIG. 4) arranged to the elevator car 202*a*, 202*b* to which the electronic overspeed monitoring equipment is provided.

The elevator car 202*a*, 202*b* may comprise a first brake control unit for controlling the elevator car brakes. The first brake control unit is connected to the elevator car brakes via cables. The elevator car brakes are holding brakes for holding the elevator car 202*a*, 202*b* every time the elevator car 202*a*, 202*b* stops to a landing. The elevator car brakes engage against guide rails 508 of the elevator car 202 in a prong-like manner. The elevator car brakes comprise triggering elements connected to the first brake control unit. The triggering elements of the elevator car brakes may comprise e.g. electromagnets. Alternatively, the triggering elements of the elevator car brakes may comprise linear actuators, such as spindle motor. In case of a hydraulic or a pneumatic brake, the triggering elements of the elevator car brakes may comprise an electrically controllable valve. The elevator car brakes are closed every time the elevator car 202*a*, 202*b* stops to a landing and the elevator car brakes are opened when the elevator car 202*a*, 202*b* starts to move again. The elevator car brakes are used especially in mid-rise and high-rise elevator systems. In low-rise elevator systems the hoisting machinery brakes 214*a*, 214*b* may be adequate for holding brakes, but elevator brakes may also be used in the low-rise elevator systems. The mid-rise and high-rise elevator systems are implemented in e.g. high buildings comprising a large number of landings, such as travel heights above 15-100 meters, and the low-rise elevator system are implemented in e.g. lower buildings comprising smaller number of landings, such as travel heights up to 15 meters.

The drive unit 206*a*, 206*b* may comprises a second brake control unit for controlling the hoisting machinery brakes 214*a*, 214*b*. The hoisting machinery brakes 214*a*, 214*b* comprises triggering elements connected to the second brake control unit. The triggering elements may comprise e.g. electromagnets. The hoisting machinery brakes 214*a*, 214*b* may be opened when the brake control unit supplies current to the triggering elements and the hoisting machinery brakes 214*a*, 214*b* may be closed when current supply to the triggering elements is interrupted. The second brake control unit is connected to the triggering elements of the hoisting machinery brakes 214*a*, 214*b* via cables.

The absolute positioning system of the electronic overspeed monitoring equipment may be configured to provide continuously information representing movement of the elevator car 202*a*, 202*b* or movement of the counterweight 220*a*, 220*b* and is communicatively connected to the safety monitoring unit 402 via the safety data bus. The absolute positioning system may comprise an encoder 504 and a door zone sensor system.

The encoder 504 may be configured to provide continuously position information of the elevator car 202*a*, 202*b* or the counterweight 220*a*, 220*b*. The encoder 504 may be arranged to the elevator car 202*a*, 202*b* in association with elevator car pulley(s) 502 or at least one guide roller, i.e. guide shoe, interposed between the elevator car 202*a*, 202*b* and a guide rail to provide continuous position information of the elevator car 202*a*, 202*b*. Alternatively, the encoder 504 may be in association with the governor pulley of the mechanical overspeed governor to provide continuous position information of the elevator car 202*a*, 202*b*. Above it is described that each elevator car with the lowest rated speed may be provided with the mechanical overspeed governor, but also each elevator car provided with the electronic overspeed monitoring equipment may be provided with the mechanical overspeed governor even though the electronic overspeed monitoring equipment performs the overspeed monitoring. Alternatively, the encoder 504 may be arranged to the counterweight 220*a*, 220*b* in association with counterweight pulleys or at least one second guide roller interposed between the counterweight 220*a*, 220*b* and the second guide rail to provide continuous position information of the counterweight 220*a*, 220*b*. At least one guide rail may be arranged vertically in the hoistway 208*a*, 208*b* to guide and direct the course of travel of the elevator car 202*a*, 202*b*. At least one guide roller may be interposed between the elevator car 202*a*, 202*b* and the guide rail to ensure that the lateral motion of the elevator car 202*a*, 202*b* may be kept at a minimum as the elevator car 202*a*, 202*b* travels along the guide rail 508. Furthermore, at least one second guide rail may be arranged vertically in the hoistway 208*a*, 208*b* to guide and direct the course of travel of the counterweight 220*a*, 220*b*. At least one second guide roller may be interposed between the counterweight 220*a*, 220*b* and the second guide rail to ensure that the lateral motion of the counterweight 220*a*, 220*b* is kept at a minimum as the counterweight 220*a*, 220*b* travels along the guide rail. The encoder 504 may be a magnetic encoder, e.g. quadrature sensor, such as a Hall sensor, comprising a magnetic wheel 503, e.g. magnetic ring, mounted concentrically with an elevator car pulley 502, counterweight pulley, a guide roller 506, or a governor pulley of an overspeed governor. The encoder 504 may be configured to measure incremental pulses from the rotating magnet wheel 503 in order to provide the position information of the elevator car 202*a*, 202*b* or the counterweight. The position information may be obtained continuously regardless of the place of the elevator car 202*a*, 202*b* or the counterweight 220*a*, 220*b* in the elevator hoistway 208*a*, 208*b*. The magnetic wheel 503 may comprise alternating evenly spaced north and south poles around its circumference. The encoder 504 may have an A/B quadrature output signal for the measurement of magnetic poles of the magnetic wheel 503. Furthermore, the encoder 504 may be configured to detect changes in the magnetic field as the alternating poles of the magnetic wheel 503 pass over it. The output signal of the quadrature sensor may comprise two channels A and B that may be defined as pulses per revolution (PPR). Furthermore, the position in relation to the starting point in pulses may be defined by counting the number of pulses. Since, the channels are in quadrature more, i.e. 90 degrees phase shift relative to each other, also the direction the of the rotation may be defined.

Figure 5A:
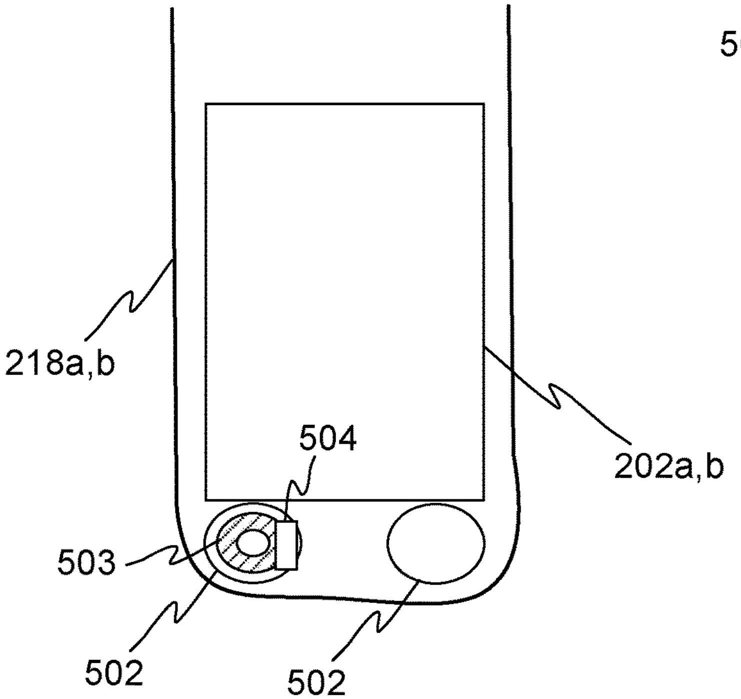
FIG. 5A illustrates schematically an example of implementation of an encoder with elevator car pulleys.
Figure 5B:
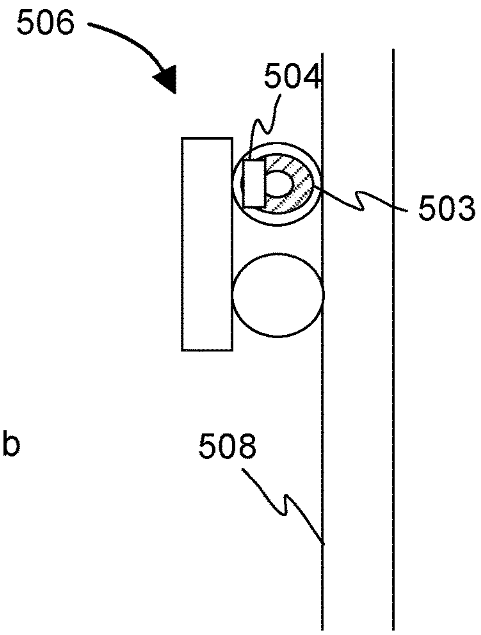
FIG. 5B illustrates an example of implementation of an encoder with guide rollers.
Figure 5C:
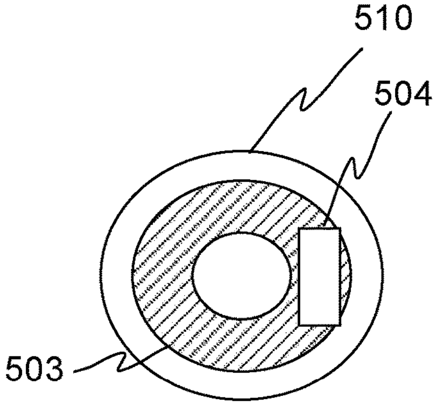
FIG. 5C illustrates schematically an example of implementation of an encoder with a governor pulley of an overspeed governor.

FIG. 5A illustrates schematically an example of association of the encoder 504 comprising a magnetic wheel 503 arranged to an elevator car pulley 502. In the example of FIG. 5A two to one roping is used, i.e. the hoisting ropes 218*a*, 218*b* passes under the elevator car pulleys 502. FIG. 5B illustrates an example of association of the encoder 5504 comprising a magnetic wheel 503 arranged to a guide roller 506 that may be interposed between the elevator car 202*a*, 202*b* or the counterweight 220*a*, 220*b* and the guide rail 508 configured to guide and direct the course of travel of the elevator car 202*a*, 202*b* or the counterweight 220*a*, 220*b*. FIG. 5C illustrates schematically an example of association of the encoder 504 comprising a magnetic wheel 503 arranged to an governor pulley 510 of an overspeed governor.

The door zone sensor system may comprise a reader device 406, e.g. a Hall sensor, arranged to the elevator car 202*a*, 202*b*, e.g. on the roof top of the elevator car 202*a*, 202*b*, or to the counterweight 220*a*, 220*b* and a target, preferably a magnet, 408*a*-408*n* arranged to the hoistway 208*a*, 208*b* within a door zone of each landing 210*a*-210*n*. The door zone may be defined as a zone extending from a lower limit below floor level to an upper limit above the floor level in which the landing door and car door equipment are in mesh and operable. The door zone may be determined to be from −400 mm to +400 mm for example. Preferably, the door zone may be from −150 mm to +150 mm. The reader 406 arranged to the elevator car 202*a*, 202*b* may obtain door zone information of the elevator car 202, when the elevator car 202*a*, 202*b* passes one of the targets 408*a*-408*n*. Alternatively, the reader arranged to the counterweight 220*a*, 220*b* may obtain door zone information of the counterweight 220*a*, 220*b*, when counterweight 220*a*, 220*b* passes one of the targets 408*a*-408*n*.

The safety monitoring unit 402 may be configured to obtain the information representing movement of the elevator car 202*a*, 202*b* or movement of the counterweight 220*a*, 220*b* from the absolute positioning system. The information representing the movement of the elevator car 202*a*, 202*b* or the movement of the counterweight 220*a*, 220*b* comprises the obtained door zone information of the elevator car 202*a*, 202*b* or the counterweight 220*a*, 220*b* and the obtained continuous position information of the elevator car 202*a*, 202*b* or the counterweight 220*a*, 220*b*. The safety monitoring unit 402 may be configured to monitor the movement of the elevator car 202*a*, 202*b* or the movement of the counterweight 220*a*, 220*b* and generate a closing command to the first brake control unit and/or to the second brake control unit, if the speed of the elevator car 202*a*, 202*b* or the speed of the counterweight 220*a*, 220*b* is detected to meet the overspeed threshold. The closing command may comprise an instruction to apply, i.e. close, the hoisting machinery brakes 214*a*, 214*b*, i.e. to interrupt the current supply to the triggering elements of the hoisting machinery brakes 214*a*, 214*b*, in order to stop the movement of the elevator car 202*a*, 202*b* and the movement of the counterweight 220*a*, 220*b*. Alternatively or in addition, the closing command may comprise an instruction to apply, i.e. close, the elevator brakes in order to stop the movement of the elevator car 202*a*, 202*b* and the movement of the counterweight 220*a*, 220*b*.

The monitoring of the movement of the elevator car 202*a*, 202*b* or the movement of the counterweight 220*a*, 220*b* may be performed in the proximity of at least one end terminal 222*a*, 222*b*, 224*a*, 224*b* of the elevator hoistway, e.g. within a section of the hoistway 208*a*, 208*b*, where the speed of the elevator car 202*a*, 202*b* approaching to the pit 228*a*, 228*b* and/or to the headroom 226*a*, 226*b*, is decelerated from the maximum rated speed.

After generating the closing command to the first brake control unit and/or to the second brake control unit, the safety monitoring unit 402 may continue the monitoring of the movement of the elevator car 202*a*, 202*b* or the movement of the counterweight 220*a*, 220*b*. The safety monitoring unit 402 may be configured to generate a triggering signal to the elevator car safety gear (not shown in FIG. 4), if the speed of the elevator car 202*a*, 202*b* or the counterweight 220*a*, 220*b* is detected to meet a second overspeed threshold, which is higher than said overspeed threshold. This improves further the safety of the elevator system 200. The second overspeed threshold may also be a continuous curve, which decreases towards at least one end terminal 222*a*, 222*b*, 224*a*, 224*b* of the hoistway 208*a*, 208*b* such that the triggering takes place with lower speeds as the elevator car 202*a*, 202*b* approaches at least one end terminal of the hoistway. The safety gear is a mechanical safety device arranged to the elevator car 202*a*, 202*b*. In response to receiving the triggering signal the safety gear acts to stop and hold the elevator car 202*a*, 202*b* by means of clamping jaws closing around the guide rails. The safety gear may comprise e.g. a solenoid as a triggering element.

Figure 6:
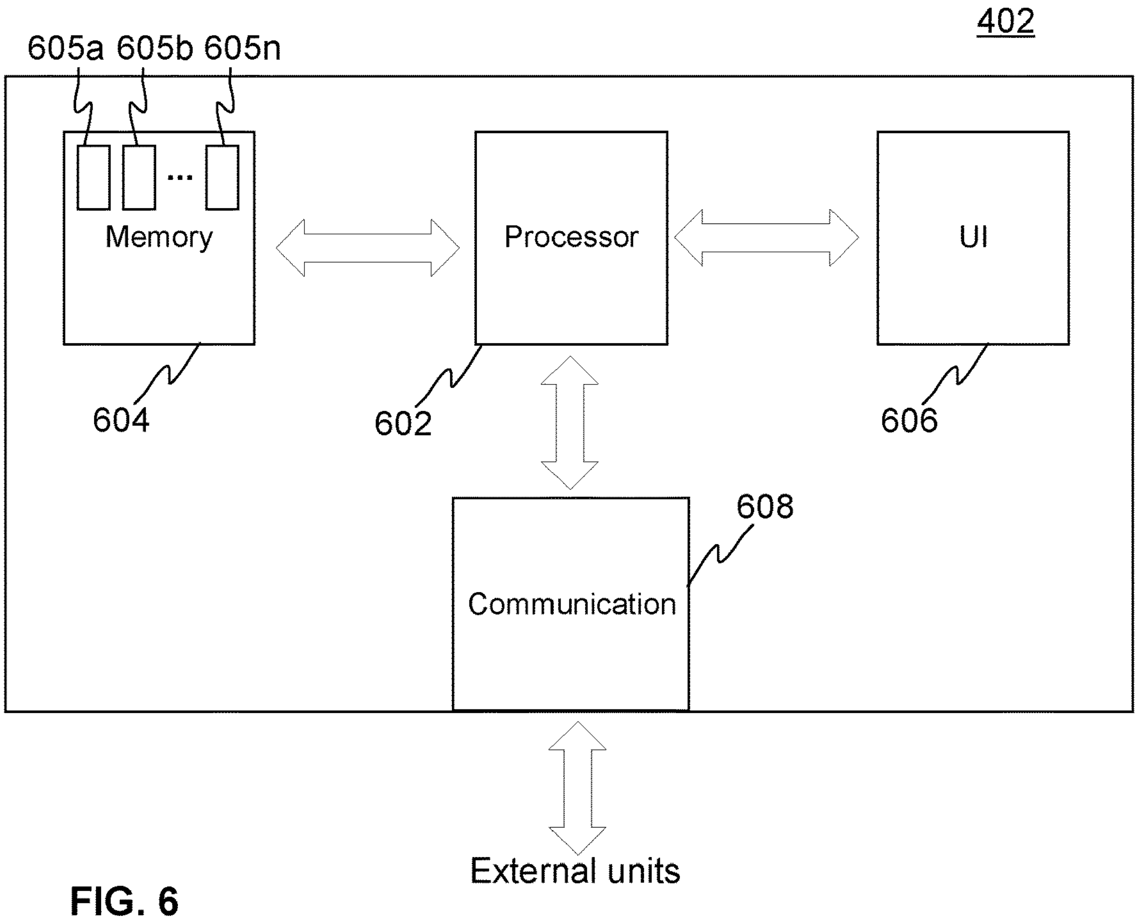
FIG. 6 schematically illustrates an example of a safety monitoring unit according to the invention

FIG. 6 schematically illustrates an example of the safety monitoring unit 402 according to the invention. The safety monitoring unit 402 may comprise a processing unit 602 comprising one or more processors, a memory unit 604 comprising one or more memories, a communication unit 608 comprising one or more communication devices, and a user interface (UI) 606. The mentioned elements of may be communicatively coupled to each other with e.g. an internal bus. The one or more processors of the processing unit 602 may be any suitable processor for processing information and control the operation of the safety monitoring unit 402, among other tasks. The memory unit 604 may store portions of computer program code 605*a*-605*n* and any other data, and the processing unit 602 may cause the safety monitoring unit 402 to operate as described by executing at least some portions of the computer program code 605*a*-605*n* stored in the memory unit 604. Furthermore, the one or more memories of the memory unit 604 may be volatile or nonvolatile. Moreover, the one or more memories are not limited to a certain type of memory only, but any memory type suitable for storing the described pieces of information may be applied in the context of the invention. The communication unit 608 may be based on at least one known communication technologies, either wired or wireless, in order to exchange pieces of information as described earlier. The communication unit 608 provides an interface for communication with any external unit, such as the brake control unit of the drive unit 206*a*, 206*b*, absolute positioning system, database and/or any external systems. The user interface 606 may comprise I/O devices, such as buttons, keyboard, touch screen, microphone, loudspeaker, display and so on, for receiving input and out-putting information.

Figure 7:
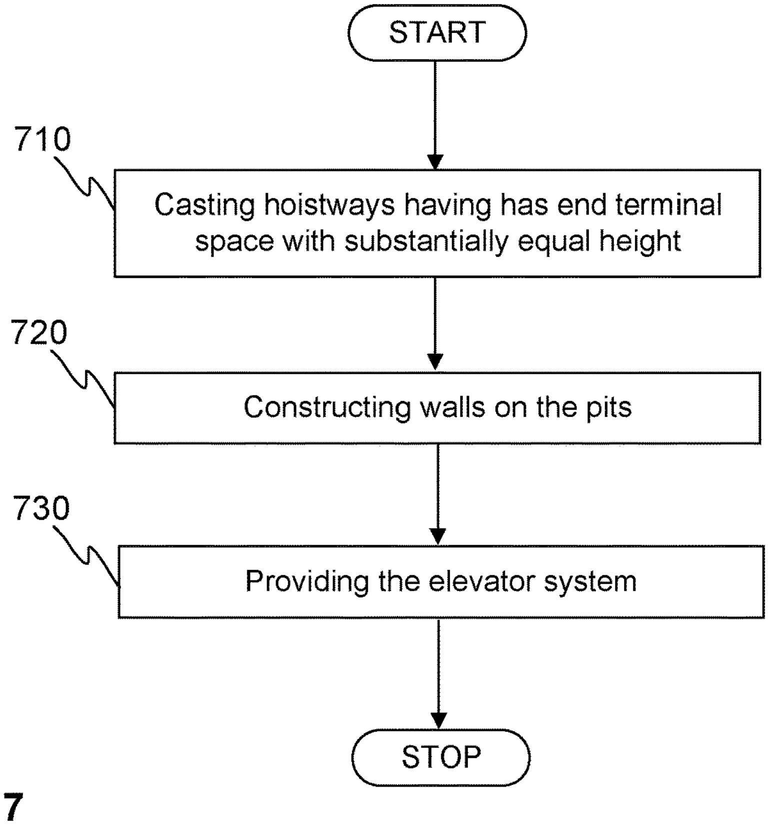
FIG. 7 illustrates schematically an example of a process according to the invention.

The invention is described above referring to the elevator system 200. However, the invention relates also to a process for providing an elevator hoistway arrangement comprising at least two separate elevator hoistways (208*a*, 208*b*) inside the same building. Next an example of a process according to the invention is described by referring to FIG. 7. FIG. 7 schematically illustrates the invention as a flow chart. The process comprises casting 710 the at least two separate elevator hoistways 208*a*, 208*b* from a castable material, such as concrete, so that each of said at least two separate hoistways 208*a*, 208*b* has a pit 228*a*, 228*b* with a substantially equal height. Next, the process comprises constructing 720, e.g. casting or building from support elements, walls on the pits 228*a*, 228*b* to define hoistways 208*a*, 208*b*. The process further comprises providing 730 the elevator system 200 as described above therein.

Furthermore, the invention relates also to an elevator hoistway arrangement comprising at least two separate elevator hoistways (208*s*, 208*b*), which are obtainable with the above described process.

The above described invention enables a unified pit structure with unified pit height, unified headroom height and/or unified safety equipment, even in case where there are several elevator cars with different maximum rated speeds in the same building. The unified pit structure is advantageous for building designers and architects, because then they do not have to take into consideration different pit depths for example when designing underground structures, such as underground parking decks. The unified headroom height enables that the headroom may be minimized even up to room height of the building. The unified pit structure with the unified pit safety equipment is also beneficial from safety point of view, as harmonization of the structures means less variation and therefore less room for errors, thus enhancing also reliability of the elevator system. The above described invention may be applicable for new elevator systems in new buildings, but may also be used for renovation of elevator systems in existing old buildings.

The verb “meet” in context of an overspeed threshold or a speed limit is used in this patent application to mean that a predefined condition is fulfilled. For example, the predefined condition may be that the overspeed threshold is reached and/or exceeded.

The term “elevator system” is used in this patent application to mean a system comprising at least two elevator sub-systems inside the same building, wherein the at least two elevator sub-systems may be separate, i.e. distinct, sub-systems without a common elevator control unit, the at least two elevator sub-systems may comprise a common elevator control unit, or at least some of the at least two elevator sub-systems may comprise a common elevator control unit. Each elevator sub-system comprises an elevator car adapted to travel in a separate hoistway.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An elevator system comprising:

at least two elevator cars adapted to travel in respective separate hoistways of the same building, the at least two elevator cars including a first elevator car and a second elevator car, wherein the first elevator car has a first rated speed and the second elevator car has a second rated speed different from the first rated speed, the first rated speed being a lowest rated speed for any of the at least two elevator cars and the second rated speed being a rated speed higher than the lowest rated speed, wherein the second elevator car is provided with an electronic overspeed monitoring equipment configured to stop movement of the second elevator car, if the speed of the second elevator car meets an overspeed threshold, wherein the overspeed threshold depends on a distance to at least one end terminal of the hoistway and the overspeed threshold decreases towards at least one end terminal of the hoistway, such that a height requirement for a bottom end terminal space and/or a top end terminal space is substantially equal for the separate hoistways of the building, the overspeed threshold at a least one distance to the at least one end terminal of the hoistway being higher than the first rated speed.

2. The elevator system according to claim 1, wherein the substantially equal height of the bottom end terminal spaces and/or the top end terminal spaces of said separate hoistways is dimensioned according to the first elevator car with the first rated speed.

3. The elevator system according to claim 2, wherein the substantially equal height of the bottom end terminal spaces and/or the top end terminal spaces of said separate hoistways is lower than height of the bottom end terminal spaces and/or top end terminal spaces of said separate hoistways dimensioned according to the rated speed of the second elevator car.

4. The elevator system according to claim 2, wherein the at least one end terminal of each of said separate hoistway is a bottom end terminal of the hoistway and/or a top end terminal of the hoistway, and wherein the bottom end terminal space is a pit of the hoistway and the top end terminal space is a headroom of the hoistway.

5. The elevator system according to claim 2, wherein each of said separate hoistway is provided with the same first safety equipment dimensioned to absorb kinetic energy of the first elevator car with the first rated speed and/or with the same second safety equipment dimensioned to absorb kinetic energy of a counterweight with speed corresponding to the first rated speed.

6. The elevator system according to claim 1, wherein the substantially equal height of the bottom end terminal spaces and/or the top end terminal spaces of said separate hoistways is lower than height of the bottom end terminal spaces and/or top end terminal spaces of said separate hoistways dimensioned according to the rated speed of the second elevator car.

7. The elevator system according to claim 6, wherein the at least one end terminal of each of said separate hoistway is a bottom end terminal of the hoistway and/or a top end terminal of the hoistway, and wherein the bottom end terminal space is a pit of the hoistway and the top end terminal space is a headroom of the hoistway.

8. The elevator system according to claim 6, wherein each of said separate hoistway is provided with the same first safety equipment dimensioned to absorb kinetic energy of the first elevator car with the first rated speed and/or with the same second safety equipment dimensioned to absorb kinetic energy of a counterweight with speed corresponding to the first rated speed.

9. The elevator system according to claim 1, wherein the at least one end terminal of each of said separate hoistway is a bottom end terminal of the hoistway and/or a top end terminal of the hoistway, and wherein the bottom end terminal space is a pit of the hoistway and the top end terminal space is a headroom of the hoistway.

10. The elevator system according to claim 9, wherein each of said separate hoistway is provided with the same first safety equipment dimensioned to absorb kinetic energy of the first elevator car with the first rated speed and/or with the same second safety equipment dimensioned to absorb kinetic energy of a counterweight with speed corresponding to the first rated speed.

11. The elevator system according to claim 1, wherein each of said separate hoistway is provided with the same first safety equipment dimensioned to absorb kinetic energy of the first elevator car and/or with the same second safety equipment dimensioned to absorb kinetic energy of a counterweight with speed corresponding to the first rated speed.

12. The elevator system according to claim 1, wherein the first elevator car is provided with a mechanical overspeed governor.

13. The elevator system according to claim 1, wherein each of the at least two elevator cars are provided with respective electronic overspeed monitoring equipment.

14. The elevator system according to claim 13, wherein the substantially equal height of the bottom end terminal spaces and/or the top end terminal spaces of said separate hoistways is dimensioned to be smaller than the height of the bottom end terminal spaces and/or top end terminal spaces of said separate hoistways dimensioned according to the first elevator car with the first rated speed.

15. The elevator system according to claim 1, wherein the electronic overspeed monitoring equipment comprising:

a safety monitoring unit communicatively connected to the second elevator car or to a counterweight via a safety data bus, one or more brake control units, one or more safety brakes comprising triggering elements connected to the one or more brake control units, an absolute positioning system configured to provide continuously information representing movement of the second elevator car or movement of the counterweight and is communicatively connected to the safety monitoring unit via the safety data bus, wherein the safety monitoring unit is configured to:

obtain the information representing movement of the second elevator car or movement of the counterweight from the absolute positioning system, monitor the movement of the second elevator car or movement of the counterweight, generate a closing command to the one or more brake control units, if the speed of the second elevator car or the speed of the counterweight is detected to meet the overspeed threshold, wherein the closing command comprises an instruction to apply the one or more safety brakes in order to stop the movement of the second elevator car.

16. The elevator system according to claim 15, wherein the absolute positioning system comprises:

an encoder associated with an elevator car pulley, a counterweight pulley, a guide roller, or a governor pulley of an overspeed governor, and a door zone sensor comprising a reader arranged to the second elevator car or to the counterweight and a target arranged to a door zone of each landing.

17. The elevator system according to claim 15, wherein the monitoring of the movement of the second elevator car or the movement of the counterweight is performed in the proximity of at least one end terminal of an elevator hoistway.

18. The elevator system according to claim 15, wherein after generating the closing command to the one or more brake control unit, the safety monitoring unit is configured to continue the monitoring of the movement of the second elevator car or the movement of the counterweight, generate a triggering signal to an elevator car safety gear to stop the movement of the second elevator car, if the speed of the second elevator car or the counterweight is detected to meet a second overspeed threshold, which is higher than said overspeed threshold.

19. A process for providing an elevator hoistway arrangement comprising at least two separate elevator hoistways inside the same building, wherein the process comprising:

casting the at least two separate elevator hoistways from a castable material so that each of said at least two separate hoistways has a pit with a substantially equal height, constructing walls on the pits to define the hoistways, and providing the elevator system according to claim 1.

20. An elevator hoistway arrangement comprising at least two separate elevator hoistways, which are obtainable with the process according to claim 19.

* * * * *